United States Patent [19]
Tackbary et al.

[11] Patent Number: 6,092,054
[45] Date of Patent: *Jul. 18, 2000

[54] METHOD AND APPARATUS FOR COMMUNICATING WITH A CARD DISTRIBUTION CENTER FOR SELECTING, ORDERING, AND SENDING SOCIAL EXPRESSION CARDS

[75] Inventors: Mary Thomasma Tackbary, Riverwoods; Dan G. Friedrich, Chicago, both of Ill.

[73] Assignee: Hallmark Cards, Incorporated, Kansas City, Mo.

[ * ] Notice: This patent is subject to a terminal disclaimer.

[21] Appl. No.: 09/294,639

[22] Filed: Apr. 19, 1999

Related U.S. Application Data

[63] Continuation of application No. 08/709,573, Sep. 6, 1996, Pat. No. 5,960,412, which is a continuation of application No. 08/239,251, May 6, 1994, Pat. No. 5,555,496.

[51] Int. Cl.⁷ .......................... G06F 17/60; G06F 17/00; G06F 7/00
[52] U.S. Cl. .......................... 705/27; 700/232; 700/233; 700/234; 700/235; 705/26
[58] Field of Search .................................. 705/1, 14, 26, 705/27; 235/383; 395/200.47, 200.49; 707/104, 500; 364/468.24, 479.01, 479.03, 479.04, 429.05; 700/95, 233, 117, 231, 232, 234, 235; 709/206

[56] References Cited

U.S. PATENT DOCUMENTS

| | | | |
|---|---|---|---|
| 5,555,496 | 9/1996 | Tackbary et al. | 705/27 |
| 5,600,563 | 2/1997 | Cannon et al. | 700/117 |

*Primary Examiner*—Stephen R. Tkacs
*Attorney, Agent, or Firm*—Duft, Graziano & Forest, P.C.

[57] ABSTRACT

A system for communicating with a card distribution center for selecting, ordering, and sending social expression cards using a personal computer. The user can enter names and addresses of card recipients into the system wherein the information is maintained in a database. The system displays digitized images of the cards on a display screen which are retrieved from a card database. From the cards displayed, the user can select cards for designated recipients and enter personalized messages and a digitized signature. The user may then send the order to a card distribution center, which processes the order, retrieves and prints the selected card images, including any user messages or user signature, and mails the cards to designated recipients or customers. The system maintains a database of all recipients, addresses, associated occasions and dates, card preferences, relationships and order history.

52 Claims, 12 Drawing Sheets

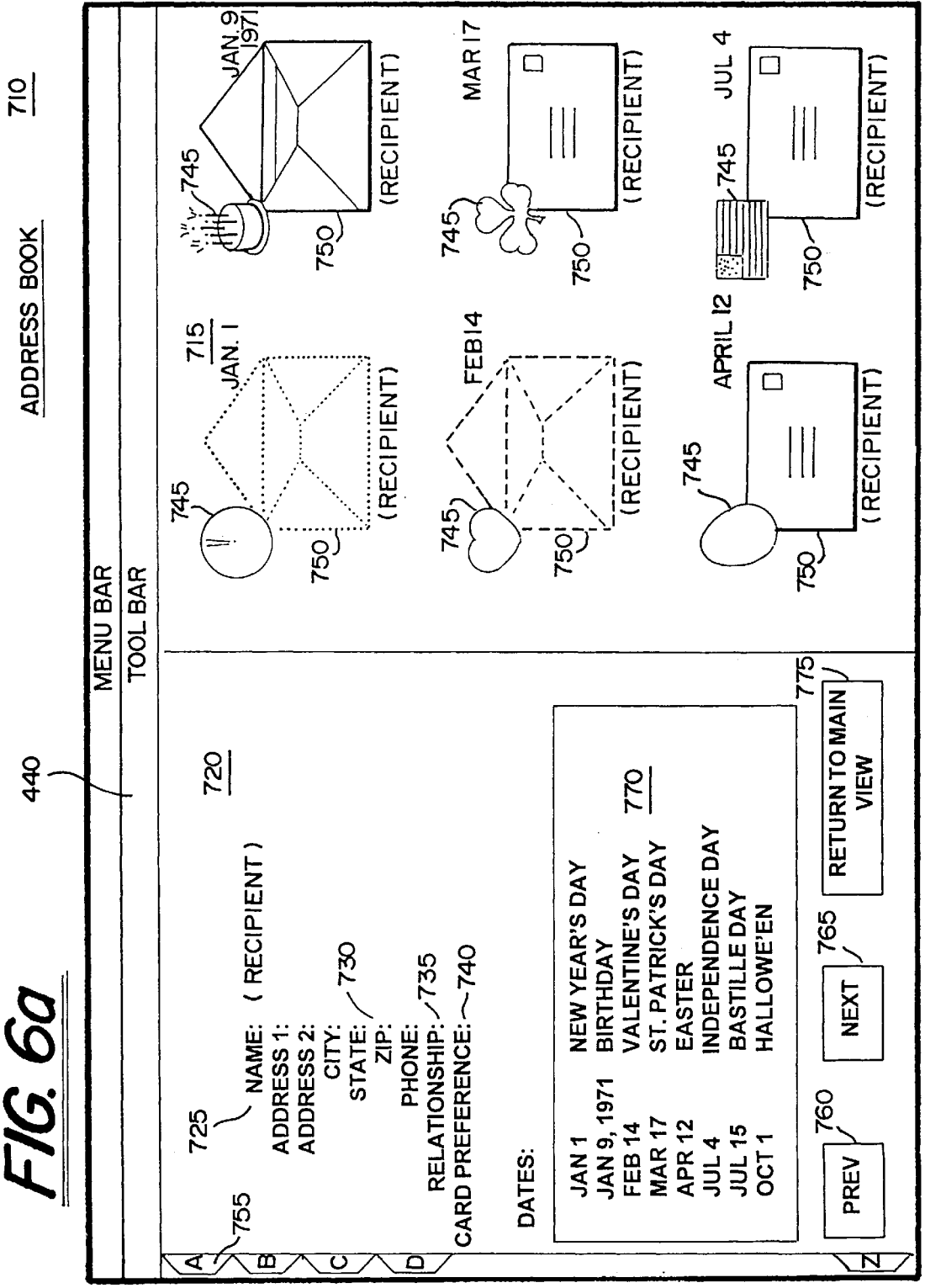

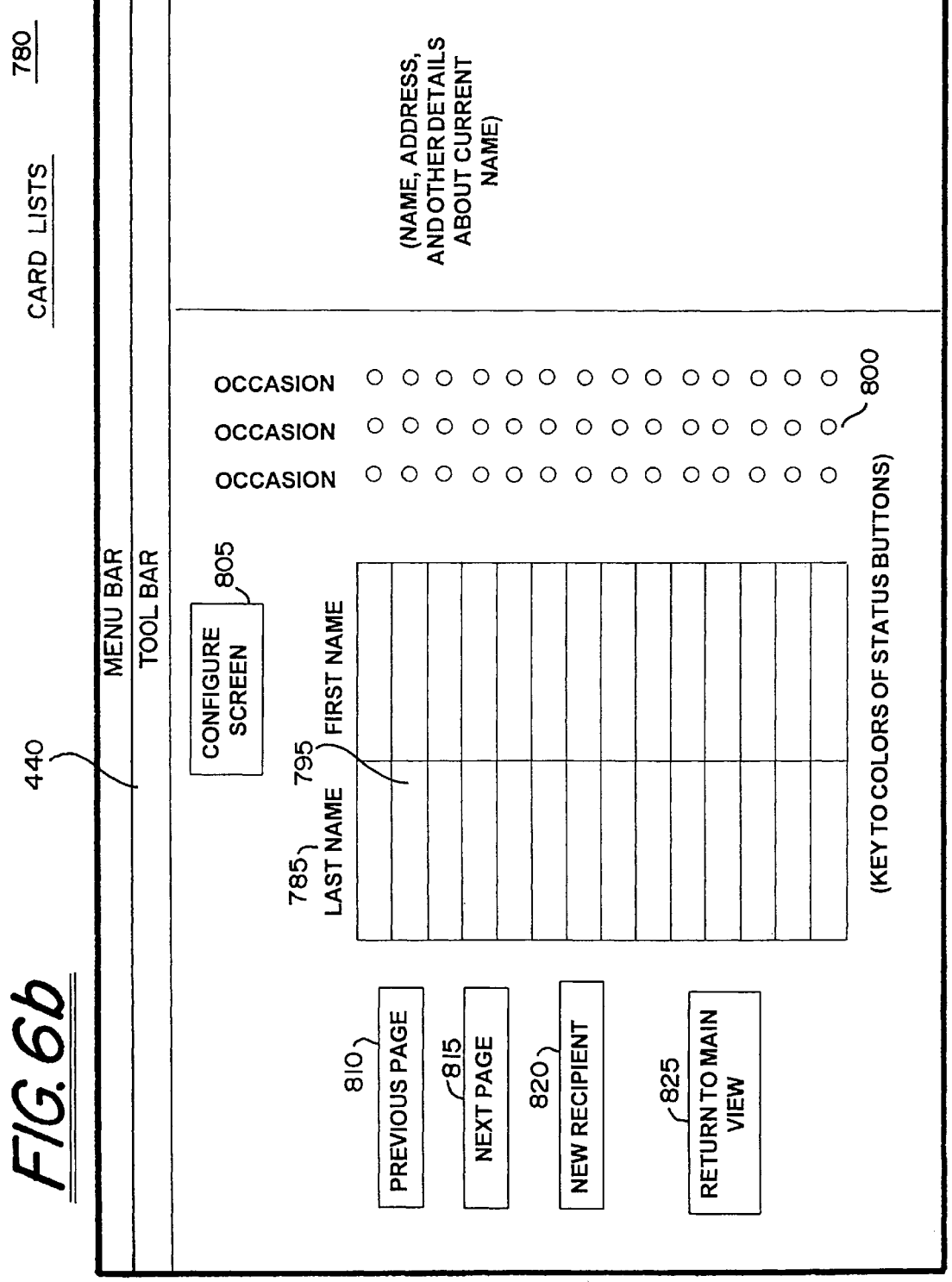

METHOD AND APPARATUS FOR COMMUNICATING WITH A CARD DISTRIBUTION CENTER FOR SELECTING, ORDERING, AND SENDING SOCIAL EXPRESSION CARDS

This application is a continuation of U.S. patent application Ser. No. 08/709,573, filed Sep. 6, 1996, now issued as U.S. Pat. No. 5,960,412, which was a continuation of U.S. patent application Ser. No. 239,251, now U.S. Pat. No. 5,555,496, filed May 6, 1994. A portion of the disclosure of this patent document contains material which is subject to copyright protection. The copyright owner has no objection to the facsimile reproduction of anyone of the patent document or the patent disclosure, as it appears in the Patent and Trademark Office patent file or records, but otherwise reserves all copyright rights whatsoever.

BACKGROUND OF THE INVENTION

This invention relates generally to computerized data communications and more particularly to an apparatus for interactive communication and processing for selecting, ordering, and delivering social expression cards.

Social expression cards have traditionally been merchandised in card specialty shops, supermarkets, drugstores, department stores, and other retail or wholesale establishments. Card merchants display cards in specially designed shelves and group them according to occasion and/or recipient attributes such as age, sex, or family relationship. Typically, merchants rotate their card stock seasonally based on the availability of new cards.

Today, many people are extremely busy, and have less spare time than in the past. Individuals waste time and are inconvenienced when required to patronize a store to purchase the cards. Supplying the appropriate postage may require a special trip to the post office or other facility to purchase stamps. Additional time and effort is required to address, seal, and mail the cards. As a further inconvenience, card buyers must maintain the names, addresses, occasion, and important dates corresponding to persons to whom they send cards. Due to the above problems and difficulties, social expression cards are often sent in an untimely manner, or not at all. Yet, it is generally considered a socially important way to keep in touch. In fact, business organizations are increasingly finding that personal communication products such as cards improve client, employer, and/or prospect satisfaction.

Card merchants, particularly those having limited space for card displays, such as supermarkets, may not be able to display a sufficiently wide variety of cards. Cards which are stocked may become missorted on the rack or may be soiled or damaged by constant handling. Since card buyers cannot temporarily set aside cards in which they are interested, but for which they do not have an immediate use, they must purchase the card at that time.

A number of different methods for purchasing cards are available in addition to the traditional card shop. For example, individuals may purchase cards from automated kiosks which print cards. However, buying cards from such kiosks still requires that each card be selected on an individual basis for each recipient. The user cannot automatically maintain records of card recipients and card purchases. Another limitation of these kiosks is that the buyer can only view a limited selection of cards, depending on the season. Furthermore, the buyer is inconvenienced by travelling to the site of the kiosk and waiting for the cards to be printed. The purchaser is further inconvenienced by the necessity of addressing and posting the card by hand.

It is also known that card buyers can design their own cards on personal computers. However, many individuals do not wish to spend time designing cards. Moreover, the card quality is limited by user constraints such as the quality of the user's printer, quality of the available graphics and papers, and the design ability and creativity of the user.

Thus, social expression card buyers need a method of card purchasing which does not inconvenience them with its method of selecting and sending the cards. In addition, it would be advantageous to have a method that provides a wide selection of cards which also automatically maintains recipient and purchase information about the buyer's card purchases, card recipients and associated dates.

Many of the foregoing problems are solved by the present invention. The present method and apparatus for corresponding with a card distribution center for selecting, ordering, and sending social expression cards provides a convenient and efficient alternative to methods currently available.

Accordingly, it is an object of the present invention to permit the card buyer to select, address, and order social expression cards using a personal computer.

It is another object of the present invention to permit the card buyer to enter information into an integrated database program wherein the information may include recipient name, recipient address, occasion, and card delivery date.

It is yet another object of the present invention to present the card buyer with digitized images of a wide variety of cards which may be sorted according to occasion and content.

It is a further object of the present invention to permit the card buyer to include in a selected card a message of the buyer's choice, a digitized replica of the buyer's signature, and selected gifts or enclosures.

It is still another object of the present invention to permit the user, having selected a number of cards for a number of recipients, to send this order either via mail, telephone, or electronically, to a card repository and distribution center for processing.

It is yet another object of the present invention to permit the card repository and distribution center, upon receiving an order, to select designated cards from its stock or print the card from blank card stock, print the buyer's messages on the cards, and send the cards to the buyer or to the recipients.

The present invention uses a computer system for permitting buyers to communicate with a card distribution center for selecting, ordering, and sending social expression cards and for maintaining records of intended recipients, occasion dates and orders made. The user selects a recipient from a recipient database wherein at least a name and an address of the recipient is stored in the database. The user selects a card from a card database based upon the selected recipient name and based upon a card-giving occasion stored in a master occasion database. The selected recipient name and card-giving occasion appear on a video display device as textual and graphical images.

Each independent customer or buyer communicates from a remote site to the distribution center. The system includes a customer access terminal at each remote site having an input device for customer input of card recipient data, recipient occasion data, card design data, and card selection data. The system also includes a memory device for storage of data including the card recipient data, recipient occasion data, card design data, and card selection data. A video display device displays textual and graphical information representative of the card recipient data, recipient occasion data, card design data, and card selection data. A processor coupled to the video display device, the memory device, and the input device processes and controls the display of card recipient data, recipient occasion data, card design data, and card selection data to facilitate card selection and ordering for generating a card order responsive thereto and for generating and storing in memory, order history and order status. Additionally, a communication link couples the customer access terminal to the distribution center to permit the communication of the card order to the distribution center for processing of the card order.

A user occasion database is operatively linked to the master occasion database and is further operatively linked to the recipient database, card database, and an order history database. The user then orders the selected card from the card distribution center wherein the computer system is in operative communication with the distribution center. The card distribution center, upon receiving the order, pulls the selected cards or prints the cards from blank card stock, prints the user's message and signature on the cards, places the applicable enclosures into the cards, prints the address on the envelope, and sends the card to the designated recipients or the customer. The system can prompt the buyer to buy cards in time for given occasions and allows the user to automatically address cards. The database information may be manually entered by the user or imported into the program from another source.

BRIEF DESCRIPTION OF THE DRAWINGS

The features of the present invention which are believed to be novel are set forth with particularity in the appended claims. The invention, together with further objects and advantages thereof, may best be understood by reference to the following description when taken in conjunction with the accompanying drawings.

FIG. 6A is a representation of a video image of a specific embodiment of the address book view screen according to the present invention.

FIG. 6B is a representation of a video image of a specific embodiment of the card lists screen according to the present invention.

DETAILED DESCRIPTION

Figure 1:
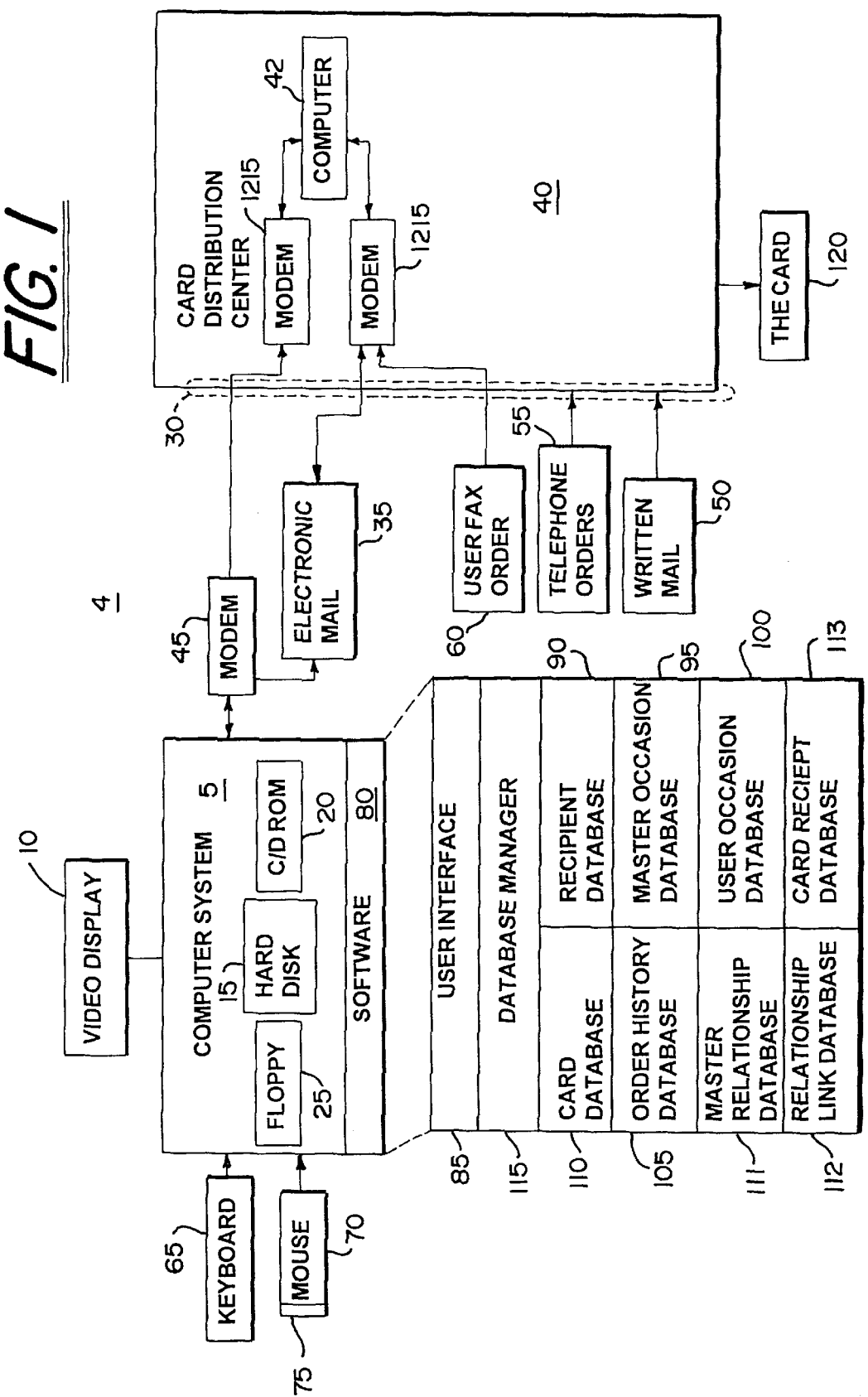
FIG. 1 is a generalized block diagram illustrating a specific embodiment of the hardware and software of a system according to the present invention.

Referring now to FIG. 1, there is illustrated a computerized order selection, processing and delivery system 4 according to the present invention. The present invention includes a computer system 5 and a video display device 10, such as a high-resolution color monitor manufactured by Wyse, Model 670, or an LCD display or other suitable image display device. The computer system 5 may be an IBM® or IBM® compatible computer, Apple Macintosh™ computer, or other suitable personal computer or computer system. The present invention is developed to run on most personal computer platforms using conventional operating systems such as Microsoft DOS® and compatible operating systems, Microsoft Windows™, Apple Macintosh®, UNIX, and IBM OS/2®. However, other future operating systems are contemplated.

The computer system 5 includes a hard disk drive 15 and preferably further includes a compact disk read-only-memory (CD-ROM) drive 20. A floppy disk drive 25 is also included. The hard disk drive 15 and CD-ROM drive 20 are preferably integral with and contained inside of the computer system 5. However, any suitable configuration of hard disk drive 15 and CD-ROM drive 20 or other mass storage devices may be used. The CD-ROM drive 20 may be a Sony, Model CDU-33A, and the hard disk drive may be a Western Digital, Model Caviar.

To permit a user to place a card order 30 via electronic means such as electronic mail 35 to a card distribution center 40, the computer system 5 includes a modem 45 (e.g. a 14,400 baud modem by Intel, Model FaxModem). However, other methods for corresponding with the card distribution center 40 are available such as written mail 50, telephone ordering 55, or fax ordering 60. The electronic order is coupled via the modem 45 and telephone lines to a computer 42 at the card distribution center 40.

In the illustrated embodiment of the system 4, the user may communicate to the computer system 5 through data entry devices such as a standard keyboard 65 and a pointing device such as a mouse 70. However, other data entry devices may be used such as speech recognition devices. The term "click-on" or "clicking", as will be used hereinafter, is well known to computer users familiar with mouse devices 70. These terms mean that a particular action is taken by the computer system 5 when the user depresses a button 75 on the mouse 70 while a symbol corresponding to the position of the mouse relative to a graphical image on the video display device 10 is shown.

The software 80 of the present invention is executed by the computer system 5 and includes a user interface 85 for interacting with the user through the keyboard 65 or the mouse 70. Included are five main databases: a recipient database 90, a master occasion database 95, a user occasion database 100, an order history database 105, and a card database 110. Also, included are three supplemental databases: a master relationship database 111, a relationship link database 112 and a card receipt database 113. The databases are managed by a database manager program 115 such as Q&E MultiLink/VB Version 2.0, published by Q&E Software, but any suitable database management program may be used.

Figure 2:
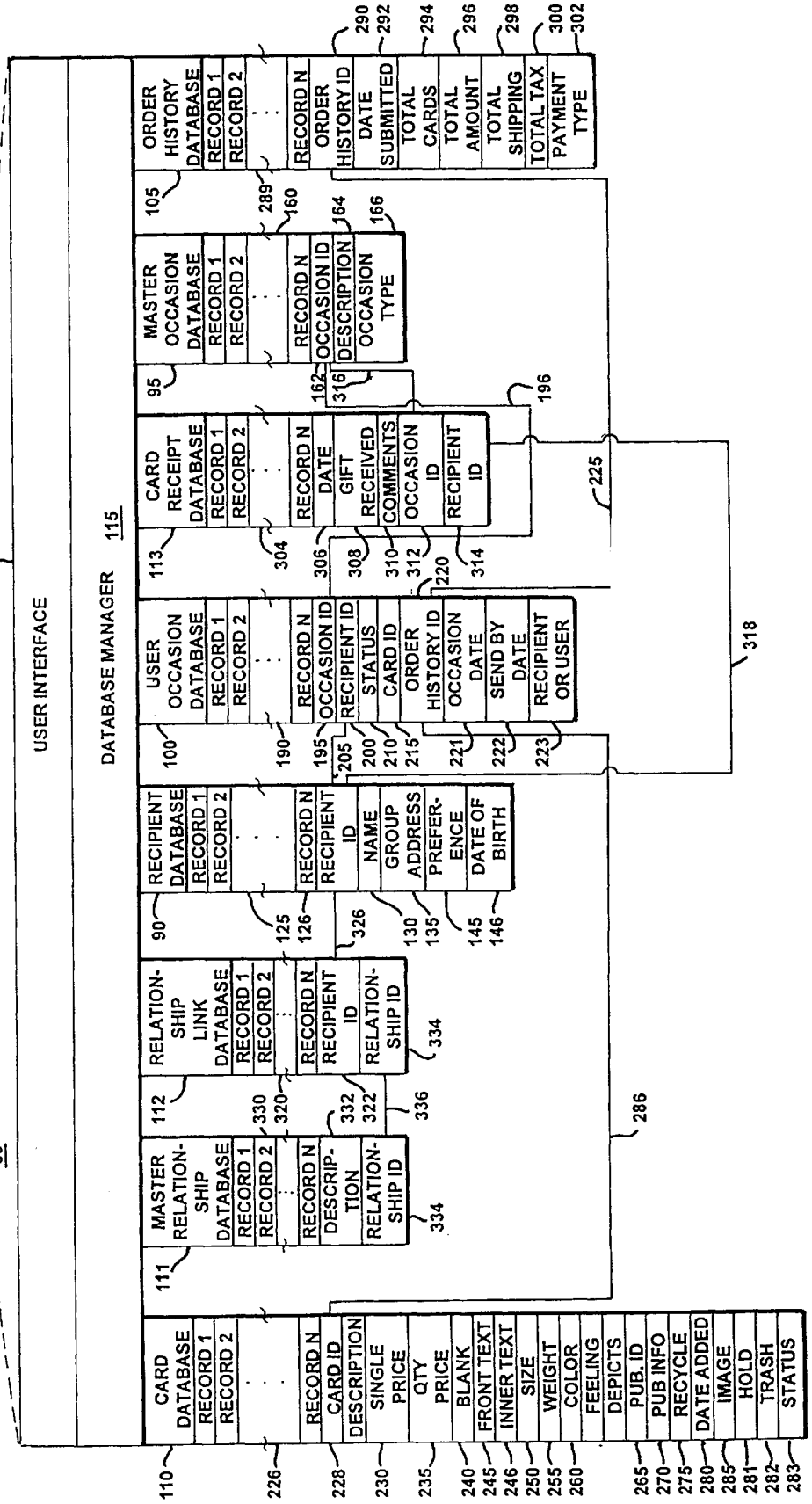
FIG. 2 is an enlarged view of the software block as shown in FIG. 1, illustrating a specific embodiment of a data structure of the databases according to the present invention.
Figure 3:
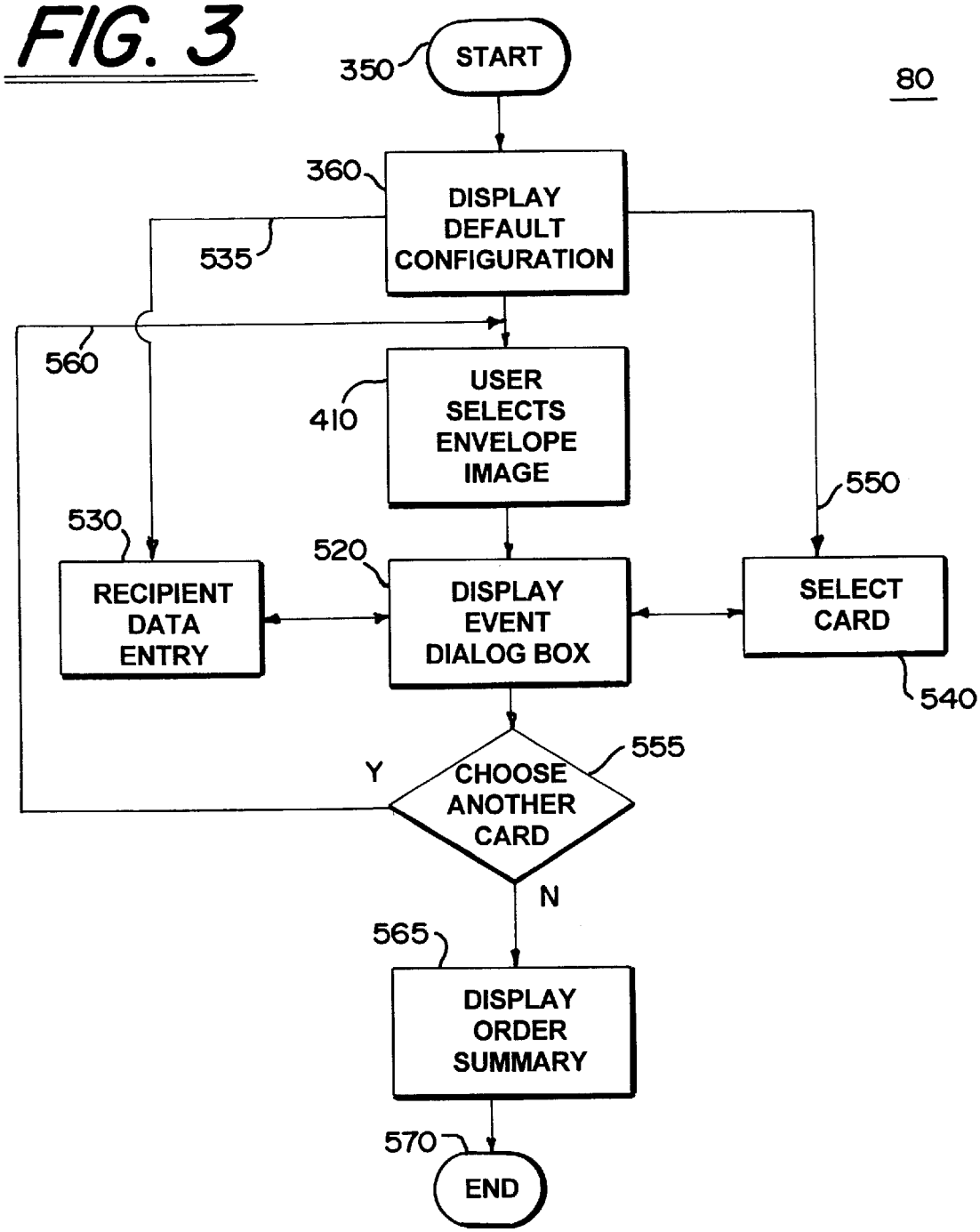
FIG. 3 is a diagram depicting a flow chart illustrating the logical flow of a specific embodiment of the software according to the present invention.

Referring now to FIG. 2, there is shown a diagrammatic illustration of a specific embodiment of the software structure for the system 4. The user interface 85 allows the user to enter information into the recipient database 90 and the card receipt database 113, select cards for various recipients from the card database 110, and place card orders 30 with the card distribution center 40.

The recipient database 90 is maintained by the user on the computer system 5 and is stored, in the illustrated embodiment, on the hard disk drive 15 (FIG. 1). The user enters information into the recipient database 90 concerning persons to whom the user desires cards to be sent. The recipient database 90 includes multiple records 125 where each record corresponds to one particular recipient.

The information in each record 125 includes a recipient identification field 126, a name field 130, a group of address fields 135, a card preference field 145, and a date of birth field 146. Alternatively, a separate database may exist which includes the date of birth field 146 and other origin dates linked to the master occasion database 95 and the recipient database 90. The user may either manually enter the information into the database, or may import the information into the recipient database 90 from a database or a personal information manager (PIM) 150 coupled through a PIM interface 155 of the computer system 5. However, any suitable information device, such as a personal digital assistant or an electronic list device may be used. The PIM interface 155 is configurable to accept a variety of database formats from widely used software products such as those marketed by Lotus Development Corp., WordPerfect Corp., Microsoft Corp., and Borland International.

The master occasion database 95 includes multiple records 160 of information wherein each record includes information concerning particular generic occasions such as a holiday, birthdays, an undated anniversary, a get-well occasion, a graduation occasion, and many others as designated by a master occasion identification field 162, an occasion description field 164, and an occasion type field 166. The master occasion database 95 serves as a general library from which an occasion may be imported into the user occasion database 100.

The user occasion database 100 contains multiple records 190 where each record corresponds to one occasion for one recipient. Each record contains an occasion identification field 195 that is linked to the occasion identification field 162 in the master occasion database. The link is visually shown as 196. Also included is a recipient identification field 200 linking that record to the recipient identification field 126 in the recipient database 90. The link is visually shown as 205. Each record also includes a status field 210, a card identification field 215, an order history identification field 220, an occasion date 221, a send by date 222, and a recipient or customer field 223 indicating whether the card is to be sent to the recipient or to the customer. The order history identification field 220 links that record to a particular order history record in the order history database 105. The link is visually shown as 225.

The card database 110 contains multiple records 226 containing information about each card 120 where each card is identified by a card identification field 228. The following information is included in the card database 110: description 230; single quantity price 231; volume quantity price 235; whether the card is blank or contains text 240; front text 245; inner text 246; size 250; weight 255; color 260; feelings 261; depicts 262; publisher ID 265; whether the card is still published 270; whether the card is made of recycled paper 275; the date that the card was added 280 to the card database; a hold field 281; a trash field 282; and a status field 283. The card database 110 also contains a compressed digitized image 285 of the card 120 (or a file name containing the compressed image). Additionally, a link is provided which links the card identification field 228 in the card database 110 with the card identification field 215 in the user occasion database 100. The link is visually shown as 286. The information pertaining to each card 120 is a single record and many hundreds or even thousands of such records may be included in the card database 110.

The order history database 105 includes records that summarize every card order 30 the user has placed. The order history database 105 includes multiple records 289 of information including fields such as: an order history identification field 290; a date submitted field 292; total number of cards 294; total amount 296; total shipping cost 298; total tax 300; and payment type 302.

The card receipt database 113 contains multiple records 304 where each record pertains to a particular card received. The card receipt database 113 includes a date field 306, a gift received field 308, a comment field 310, an occasion identification field 312, and a recipient identification field 314. The occasion identification field 312 in the card receipt database 113 is linked to the occasion identification field 162 in the master occasion database 95. The link is visually shown by 316. Additionally, the recipient identification field 314 in the card receipt database 113 is linked to the recipient identification field 126 in the recipient database 90. The link is visually shown in 318.

The relationship link database 112 includes multiple records 320 pertaining to various relationships between the recipients and the customer. The relationship link database 112 allows the customer to designate multiple relationships with recipients to allow for an added search criterion (i.e. card for mother or other relative) as well as the ability to group multiple cards sent through the lists screen (described later). The relationship link database 112 contains a recipient identification field 322 and a relationship identification field 324. The recipient identification field 322 in the relationship link database 112 is linked to the recipient identification field 126 in the recipient database 90. The link is visually shown in 326.

The master relationship database 111 includes multiple records 330, both predefined and user defined, pertaining to the relationships between the customer and various recipients. The database includes a description field 332 and a relationship identification field 334 which is linked to the relationship identification field 324 in the relationship link database 112. This link is visually shown as 336.

Referring back to FIG. 1, the card database 110 preferably resides on the CD-ROM drive 20 but may reside on the floppy disk 25 or on the hard disk drive 15 of the computer system 5, or some combination thereof. Storage on the CD-ROM 20 allows for maximum storage capacity of card database 110 information, and is the most efficient and convenient method. Alternatively, the card database 110 may be remotely located from the computer system 5. If remotely located, the card database 110 may be accessed via an external source such as an on-line service as will be discussed in greater detail hereinafter. When the card database 110 is not accessed remotely, updated copies from a master card database maintained at the card distribution center 40 can be transferred into the card database 110 media (computer disk, floppy disk).

If the card database 110 is integral with the computer system 5, and not remote, the user may update the copy of the card database 110 depending upon the manner in which the card database is accessed. If it is accessed on the hard disk drive 15 or the floppy disk drive 25, it may be updated from new floppy disks using the floppy disk drive 25, or new information may be downloaded through the modem 45. If the card database 110 is accessed on the CD-ROM drive 20, the user may periodically receive updated copies of the CD-ROM or supplementary card data 110 for the hard drive 15. Alternatively, a writable CD system, such as a WORM drive, can be used allowing downloading of card data to the CD.

Figure 4:
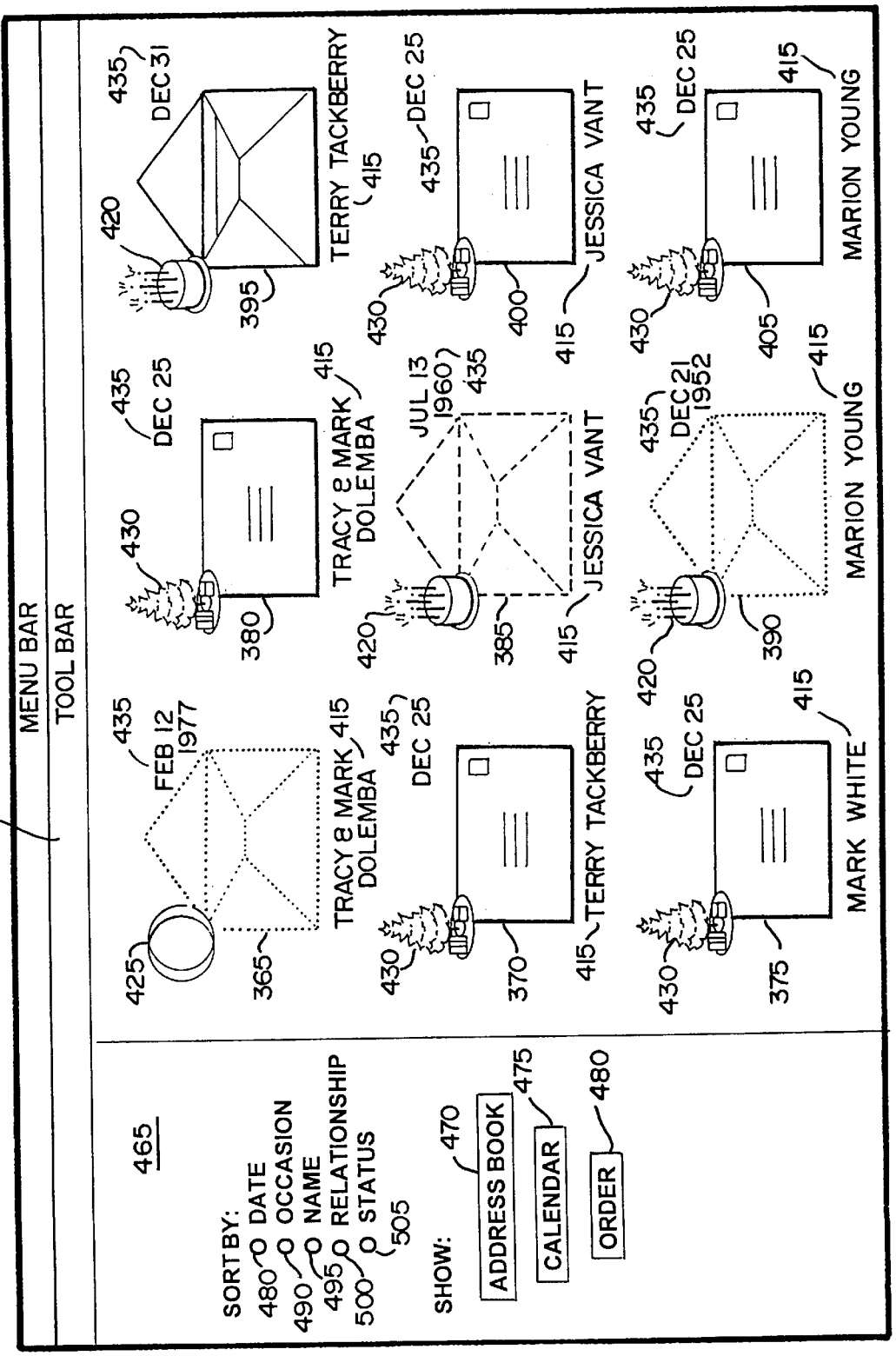
FIG. 4 is a representation of a video image of a specific embodiment of the default desktop configuration screen as shown on the video display device when the software program is initiated.

Referring now to FIGS. 3–6A, the software 80 begins as shown in step 350 and a default desktop configuration view 355 is displayed as shown in step 360. The default desktop configuration view 355 depicts an array of images resembling envelopes 365–405. The image is shown in FIG. 4 in a Microsoft Windows® format, but any suitable operating environment may be used.

Next, the user may select a particular envelope, as shown in step 410, by clicking an envelope image 365–405 shown in the default desktop configuration view 355. Each envelope image 365–405 corresponds to one or more recipients as defined by a recipient name 415 in text under the envelope.

Each envelope image 365–405 represents a specific card-giving occasion for which the recipient 415 may receive a card. A symbol, known as an icon, appears next to the envelope image 365–405 and may represent for example, a birthday cake 420, if the occasion is a birthday, an anniversary symbol, if the occasion is an anniversary, or a Christmas tree 430, if the occasion is Christmas. The date of the occasion 435 is also shown.

Additionally, the image of the envelopes 365–405 conveys information regarding the urgency of the occasions. The image of the envelope informs the user how urgently he must attend to the order, based upon the date when the occasion associated with the envelope image will occur. If the occasion will not occur for a relatively long period of time, the image of the envelope appears as a faint outline of an envelope, as shown by envelope image 385. If the occasion will occur fairly soon, the image appears partially grey as shown by envelope image 365. If the occasion will occur very soon and requires immediate attention, the image appears as a normal envelope as illustrated by envelope images 370, 375, 380, 395, 400 and 405. Finally, if the occasion is past due and the user has not placed the order, the card is tinted red as shown by envelope image 390. The periods of time referenced above are automatically provided by the software 80 as reasonable default values, but may be changed by the user either globally or on an occasion-by-occasion basis.

The image of the envelope also conveys the status of the order. If the envelope appears open and empty (e.g. image 365), then the user has not yet chosen a card for the event. If the envelope appears open and contains a card inside (e.g., image 395), the user has tentatively chosen a card for the event but has yet to finalize the order. If the envelope appears as a normal sealed envelope as illustrated by envelope image 370, then the user has chosen a card for the event, selected a method of delivery for the card, and has finalized the order.

The user also can view at the top of the default desktop configuration view 355 a toolbar 440 containing buttons (not shown) which allow the user one-click access to frequently used windows which are opened and closed in response to the user. Other frequently used windows include a card sort window 465, an address book window 470 for entering recipient data, a calendar window 475, and an order summary window 480. The address book window 470 and calendar window 475 permit the user to alter the appearance of the default desktop configuration screen 355 by displaying view screens that filter and group the envelope images. Additionally, the user may sort the array of envelope images 365–405 by date 485, occasion 490, name 495, relationship 500, or status 505, directly from the current screen.

Once the user selects an envelope for an event shown in the default desktop configuration view 355, as shown in step 410, a card event dialog box 515 appears as shown in step 520. The card event dialog box 515 provides the user with information about the selected card-giving occasion through additional boxes and text including the name 60 and address 605 of the selected recipient, the status of the selected event 640, and selected occasion 670, as shown.

From within the card event dialog box 515, the user may update the card recipient data on card recipient screen 525 for one recipient or for all recipients, as shown in step 530 by clicking the address book button 645. Additionally, the card recipient data entry screen 525 can be accessed directly from the default desktop configuration screen 355 without the intermediate step of displaying the card event dialog box 515, as shown by branch 535 by clicking the address book button 470.

Also, from within the card event dialog box 515, the user can select a card for one occasion as shown in step 540, by clicking the select card button 545 within the card event dialog box. As shown in branch 550, the user can select the card directly from the default desktop configuration screen 355 without the intermediate step of displaying the card event dialog box 515 by clicking an occasion envelope, such as 365, and then clicking the toolbar 440.

Once the card and recipient information is entered, the user can choose another card as shown in step 555. If the user chooses to select another card, the program branches back to step 410, shown as branch 560, where the card event dialog box 515 is again displayed. While the user views the card event dialog box 515, he can complete the information for that occasion. When the user has completed the dialog box to his satisfaction, he can click a check box labeled "this card ready to order" 549. The user indicates that he is done with the card event dialog box 515 by clicking on an Ok button 650 or a cancel button 655. When the user clicks on the Ok button 650, the program saves the changes the user has made in the event dialog, closes the dialog, and returns the user to the desktop view that the user was in before the user invoked the event dialog (updating the desktop view to show the changed status of the current occasion). When the user clicks on the cancel button 655, if the user made any changes, the program asks the user to confirm that he wants to discard these changes. If the user answers yes (or if the user has made no changes), the program closes the dialog and takes the user back to his previous desktop view (with no status update).

From any desktop view, the user can switch to another desktop view. For example, in response to clicking the address book box 470 while viewing the default desktop configuration screen 355, the address book view as shown in FIG. 6A is displayed.

Finally, from any desktop view, the user can decide when to switch to the order view (described later) to place an order for all of the occasions with the order ready status (indicated by the check box labeled, "this card ready to order"). This is shown as step 565. After the user has completed the order summary view screen and exits the program, the program ends as shown in step 570 of the flow chart.

However, this is not a linear process. For example, although step 555 indicates whether the user chooses another card, no prompt appears asking the user whether he wishes to choose another card. Instead, when the user is done with the present card he may simply choose another, or he may click the order view button 480. Again, multiple options are available to the user by clicking a particular button. Rigid flow-chart paths as shown in FIG. 4 need not be followed precisely as is shown in the figure.

From the address book view 710, the user can enter information about the recipient. Here, the user may enter new information about the chosen recipient 725, and may update or delete existing information. Once in the address book view 710, the user may click the return button 775 to return the user to the default desktop configuration view 355. To enter information about other recipients, the user again may click the address book button 470.

A mail mode box 615 displayed within the card event dialog box 515 allows the user to choose the method by which the card is to be sent, such as by Federal Express® 620, United Parcel Service 625, United States Mail 630, or Overnight delivery 635. If the user has chosen a service which may not deliver the card in time for the chosen occasion, the program suggests that the user consider a speedier method of delivery.

The status 640 of the selected event for which the recipient is to receive a card is also displayed within the card event dialog box 515. The status line 640 provides general information concerning the urgency of the occasion and the state of the envelope (open, closed etc.). The card event dialog box 515 shows the select card button 545, an address book button 645, the check box labeled "this card ready to order" 549, an Ok button 650, and a cancel button 655. The user activates the select card button 545, as previously shown in step 540 to chose a particular card for the occasion.

Once the user has selected a card for an occasion after clicking the select card button 545 and has completed the associated card selection screen, an image of the front 660 and the inside 665 of the selected card appears in a selected card box 672 within the card event dialog box 515. The selected card box 672 may optionally display the price 675 of the card. At this time, the user may choose to update or add a personalized message 680 to the card, based on a font of their choice. The user may also choose to add a digitized image of a signature 685 or may choose to have items inserted into or included along with the selected card 670. In the illustrated embodiment, by clicking the appropriate selection in the insert box 690 the user may insert a check 695, a charitable donation 700, confetti 705, or gifts selected from a gift catalog into the selected card 670.

Figure 5:
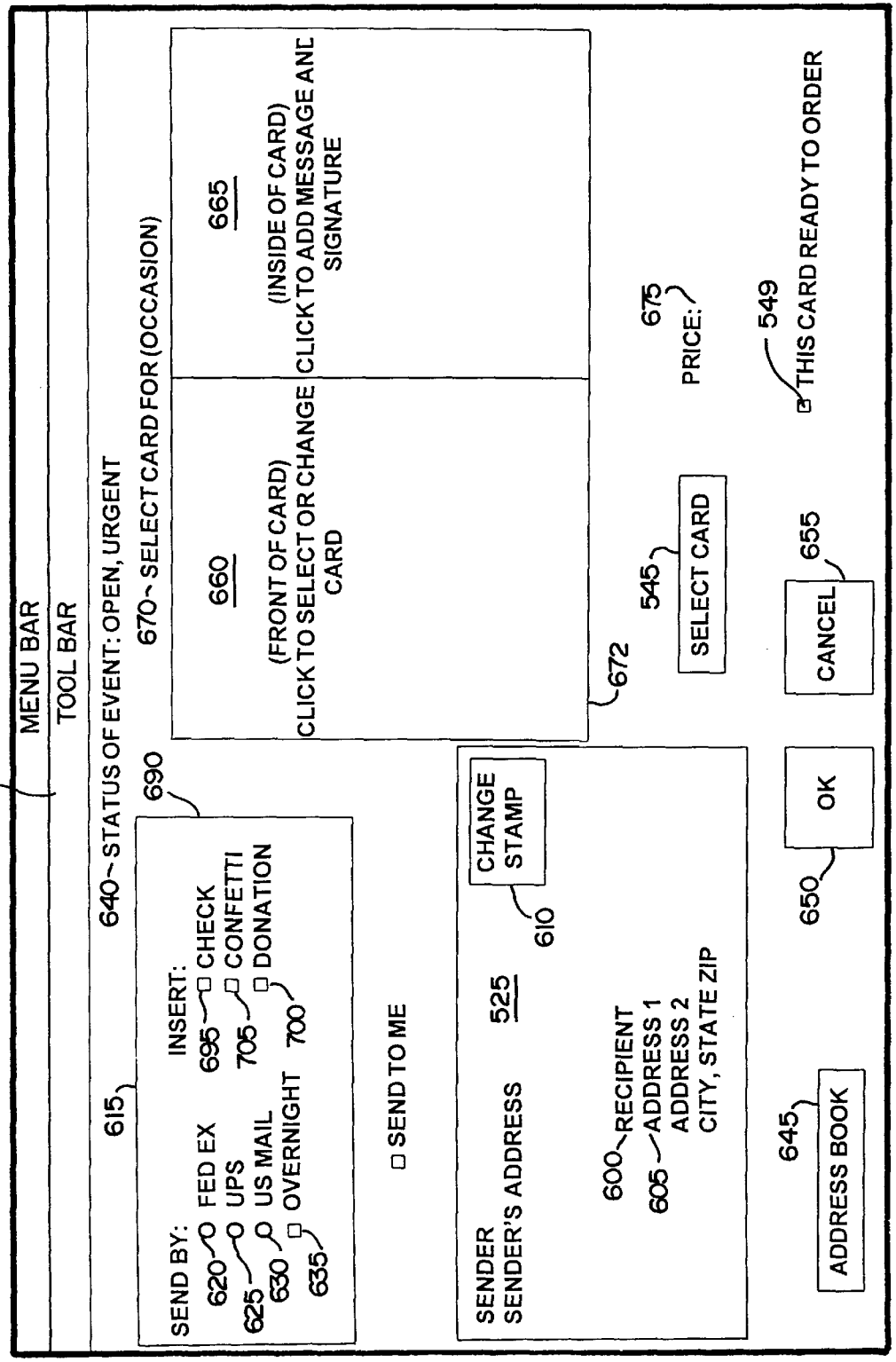
FIG. 5 is a representation of a video image of a specific embodiment of the card event dialog box according to the present invention.

Referring now to FIGS. 4, 5 and 6A, in response to clicking the address book box shown in either FIG. 4 (470) or FIG. 5 (645), an address book view screen 710 is displayed as shown in FIG. 6A. The screen is split between a desktop configuration view 715 (similar to the default desktop configuration view 355 shown in FIG. 4) and an address book view 720 into which the user enters information regarding recipients such as name 725, address 730, relationship to the user 735, and card type preference 740. Here, the user can view all of the occasions for a selected named recipient 725, as shown by the displayed occasion icons 745 and an occasion list 770. The user also views the status of the order, as indicated by the appearance of the envelope images 750 for that recipient (open, closed, or empty etc.). The user may also view occasions for other recipients by navigating the address book view 720 using alphabetical tabs 755 and using previous 760 and next 765 buttons. For the recipient 725 shown, all occasion dates are listed in the occasion list 770. The user returns to the default desktop configuration 355 of FIG. 4 by clicking the return to main view button 775.

Referring to FIG. 6B, rather than selecting individual cards for individual events, the user may compile lists of people who should receive cards on given occasions, such as a Christmas mailing list. The user clicks the lists button (not shown) on the toolbar 440 within the default desktop configuration screen 355 and a card lists screen 780 is displayed. In this screen the user may edit a recipient list 785 by first clicking the configure screen button 805 to display the selected mailing list. The configure screen button 805 allows the user to customize the cards list 780 so that only certain information is displayed. For example, the user can customize the screen 780 to display summary information about a number of occasions for the listed recipients; to display more detail about one occasion, including whether the recipients have sent cards to the user in the past; to display or turn off display of the address and other details for the currently selected name, and the like. Users can also configure the screen to filter the displayed recipients so that, for example, only business prospects of the user are displayed, or only relatives are displayed. The customization options are saved from session to session.

The user may then selectively add and remove named recipients from mailing list 785. To add a new name to the list 795 the user clicks the new recipient button 820 and enters the new name by typing their name onto a blank line which then allows the user to add that individual to the list.

Figure 7:
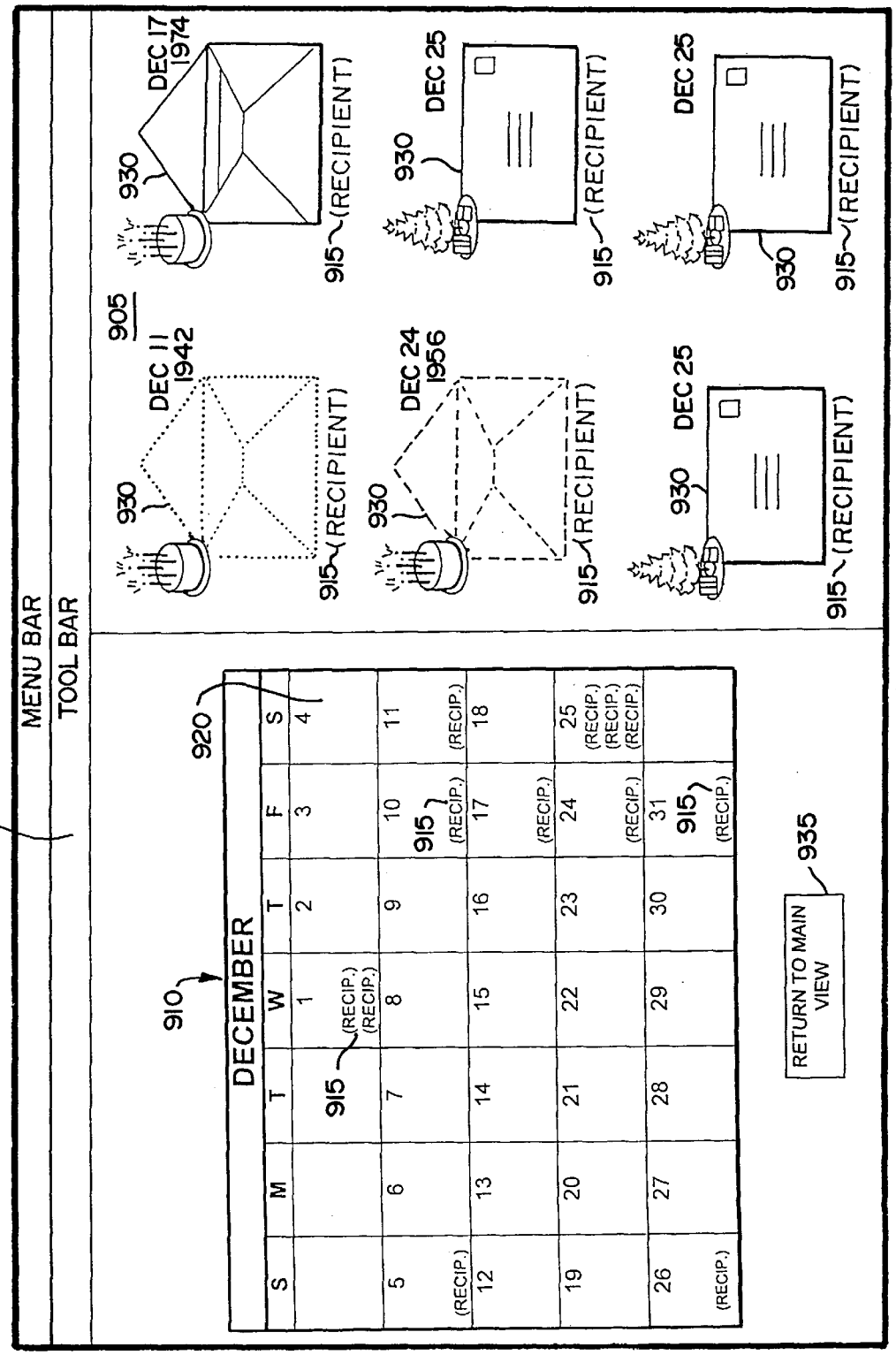
FIG. 7 is a representation of a video image of a specific embodiment of the calendar view screen according to the present invention.

Referring now to FIG. 7, in response to clicking the calendar button 475 shown in FIG. 4, a calendar view screen 900 is displayed. The calendar view screen 900 is split between a desktop configuration view 905 (similar to the default desktop configuration view 355 shown in FIG. 4) and a calendar 910 showing all days for a given period of time, such as for one month. The calendar 910 displays events for all recipients within that period of time shown. A recipient name 915 (or multiple names) is shown within a calendar date box 920. Again, the appearance of the envelope images 930 in the desktop configuration view 900 indicates the status of the respective orders for each named recipient 915. The user returns to the default desktop configuration 355 (FIG. 4) by clicking a return to main view button 935.

Figure 8:
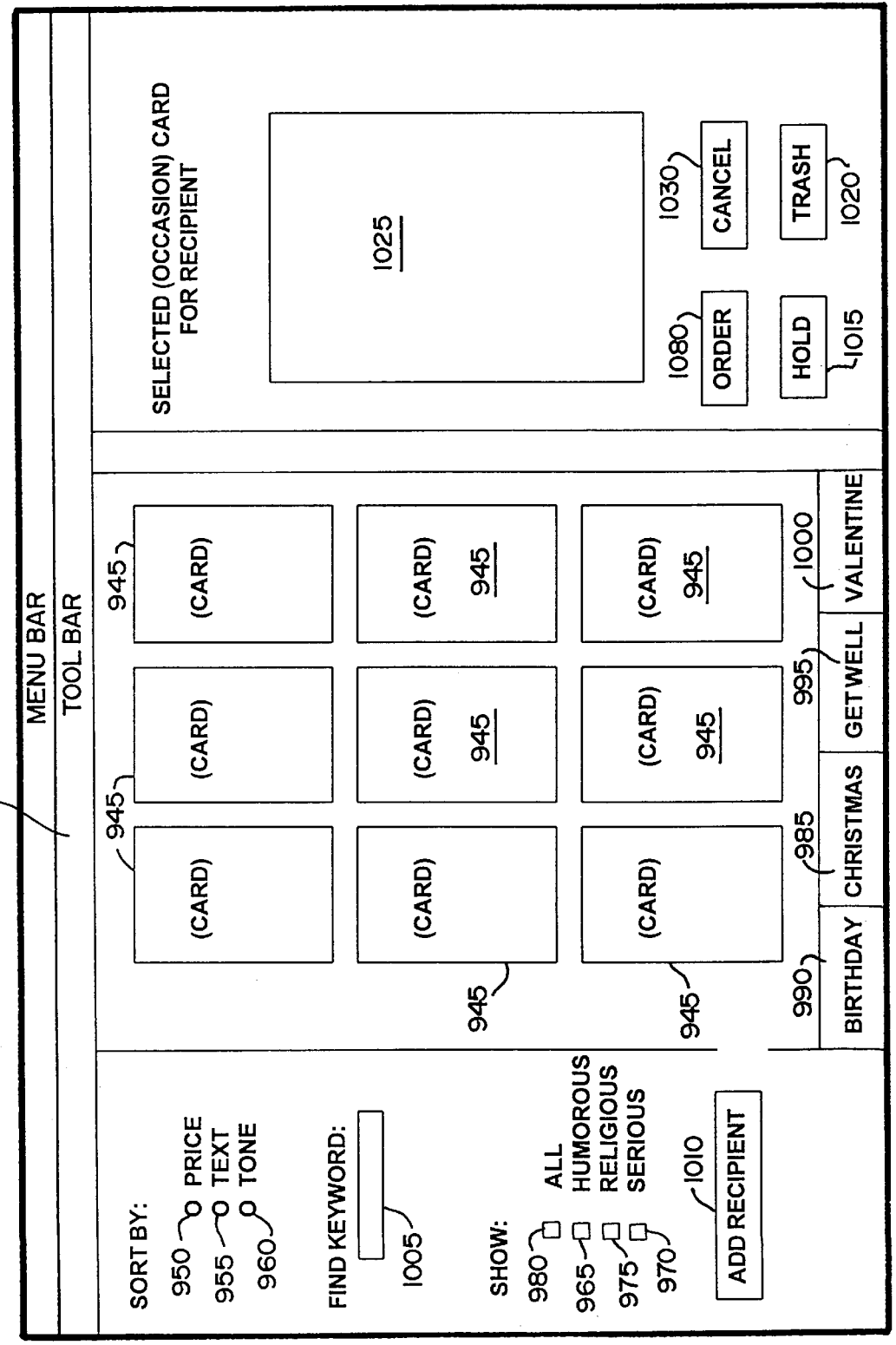
FIG. 8 is a representation of a video image of a specific embodiment of the card selection screen according to the present invention.

Referring now to FIGS. 2, 5, and 8, in response to clicking the select card button 545 shown in FIG. 5, a card selection screen 940 is displayed. Within this screen the user chooses a card for the selected occasion. The card selection screen 940 presents an array of digitized images of social expression cards 945 which are retrieved from the card database 110 containing information about hundreds or even thousands of card images. To allow the user to efficiently select the right card, the card images 945 must be sorted.

Initial sorting and filtering is performed automatically. Sorting allows the user to group data according to certain criteria such as by alphabetical order, date of birth etc. Filtering removes data from the presentation so that it is not shown to the user. When the user accesses the card selection screen 940 from within the card event dialog box 515 of FIG. 5, the cards are filtered to show only those cards relevant to the card-giving occasion. The cards may also be filtered based on the year of the selected occasion. For example, if the user is selecting a card for a recipient's 40th birthday, then the card selection screen may automatically filter and present only cards for 40th birthdays, if this option had been previously enabled. Automatic filtering may also include filtering cards depending upon the type of card the recipient is known to prefer. For example, only humorous or serious cards are displayed if specified in the card preference field 145 of the recipient database 90 record corresponding to that recipient. Thus, the user may click the check boxes that filter the card images by criteria such as humor 965, seriousness 970, or religious denomination 975.

The user may also sort the card images manually by clicking the sort by price 950, sort by text 955, or sort by tone 960 button in the card selection screen 940.

The user may also choose to access the entire card database by clicking an all button 980 and then use the images resembling notebook tabs 985–1000 shown at the button of the card selection screen 940. By clicking the notebook tabs 985–1000, the user can view the card database sorted by broad categories such as Christmas 985, birthday 990, get well 955, Valentine's Day 1000, and so forth. The user may also find cards in the card database 110 by querying it for key words and phrases by entering text into a find key word box 1005.

While in the card selection screen 940, the user may select a card for a recipient not found in the recipient database. To add a recipient not found in the recipient database 90, the user selects a card image 945 and then clicks the add recipient button 1010, which causes the address book screen 710 (FIG. 6A) to be displayed.

The user may set aside cards of interest, but which he has not yet selected, by dragging the card image 945 from the card image array to a hold box 1015 portion of the card selection screen 940. Selected card images 945 remain "held" from session to session. Card images are removed by dragging them to a trash can icon 1020. The user may also hold cards by selecting "hold" from a context sensitive menu (not shown) which may be displayed by activating a designated key on the keyboard or by pressing the right mouse button.

The user can select a card by dragging it from the card image array 945 or from the held set, to a selected card box 1025. The user may also select by using the right mouse button to display a context-sensitive menu (not shown) and choosing the select card button. Selecting a card image 945 closes the card selection screen 940 and returns the user to the card event dialog box 515 of FIG. 5. If the user does not wish to make a card selection at this time, a cancel button 1030 is clicked.

Figure 9:
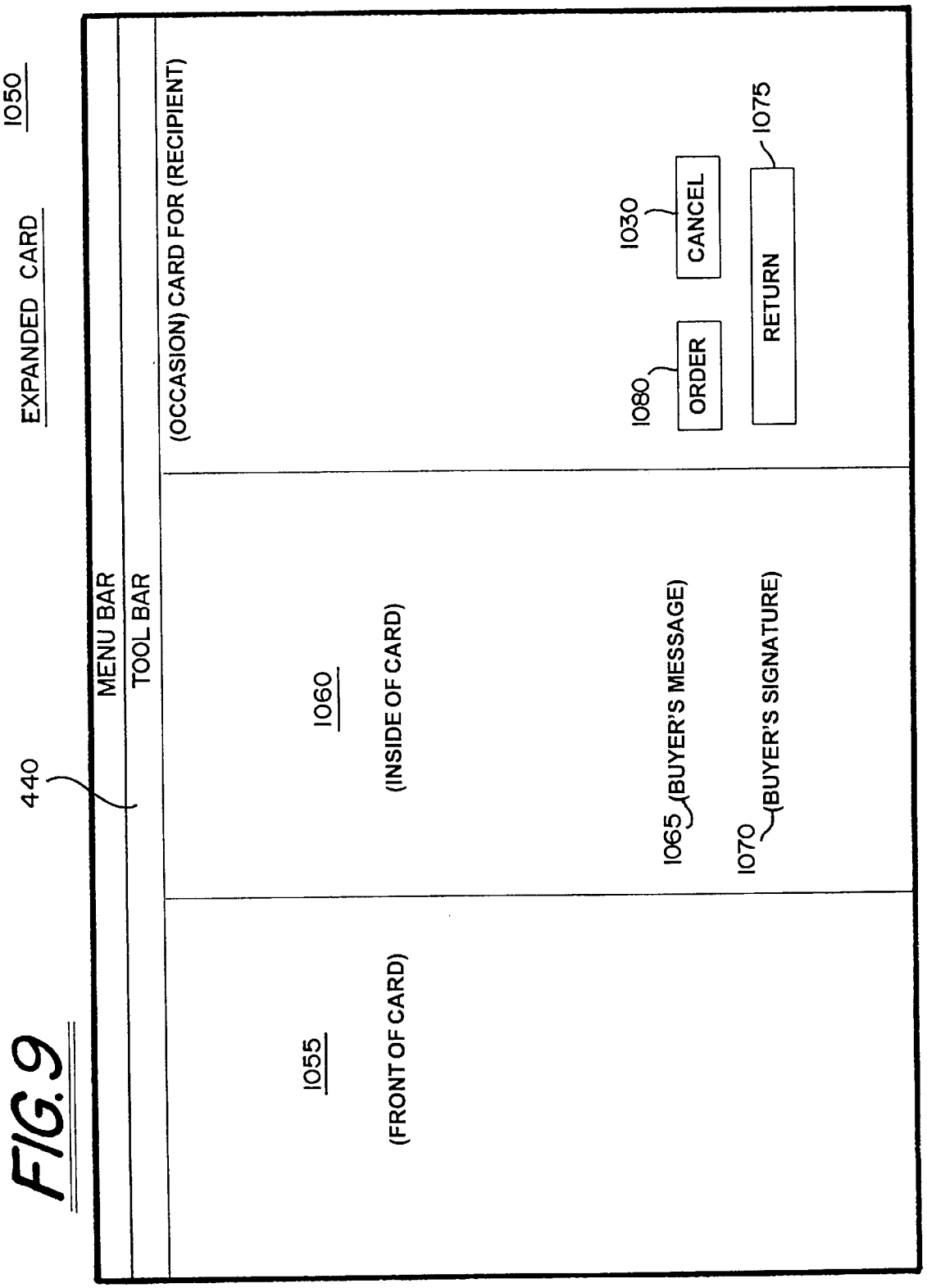
FIG. 9 is an expanded view of the card image shown in FIG. 8.
Figure 10:
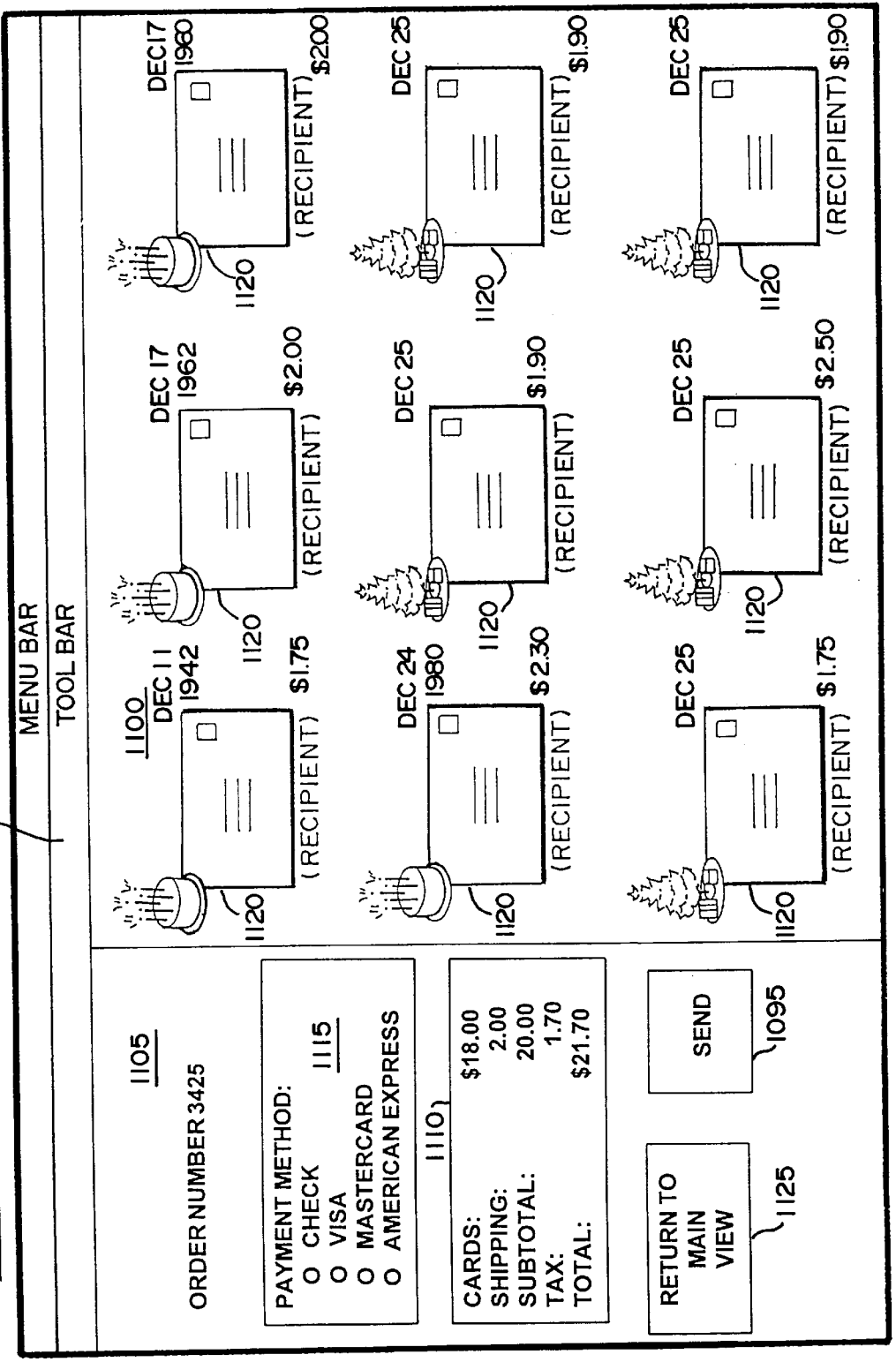
FIG. 10 is a representation of a video image of a specific embodiment of the order view screen according to the present invention.

Referring now to FIGS. 8 and 9, for many card images 945 to fit on the screen, the images are reduced and are relatively small, low detail images. However, if the user double-clicks one of the card images 945, the image expands as shown in FIG. 9 showing a close-up expanded card screen 1050. This allows the user to see the card image in greater detail. The front 1055 and inside 1060 of the card are displayed. The user may customize the card by adding a personal message 1065 or a digitized signature image 1070 to the card image. The user clicks a return button 1075 to return to the card selection screen 940.

Referring now to FIGS. 4, 8–10, the order summary view screen 1090 is displayed when the order button 480 is clicked while in the default desktop configuration screen 355. The order summary view screen 1090 is split between a card occasion desktop configuration screen 1100 (similar to the default desktop configuration view 355 shown in FIG. 4.) and an order window 1105 showing details about the user's order. An itemized cost of the order 1110 is displayed along with the means of payment 1115. The order desktop configuration view 1100 shows only those cards 1120 which are ready to be ordered. After the user confirms that the order is complete by clicking the send button 1095, the envelope images of the cards appear as sealed and addressed envelopes. At this point, the user may send the completed order to the distribution center 40 or the order may be processed using a suitable printer located at the user's site (discussed below). Clicking a return to main view button 1125 causes the default desktop configuration view 355 of FIG. 4 to be displayed.

Figure 11:
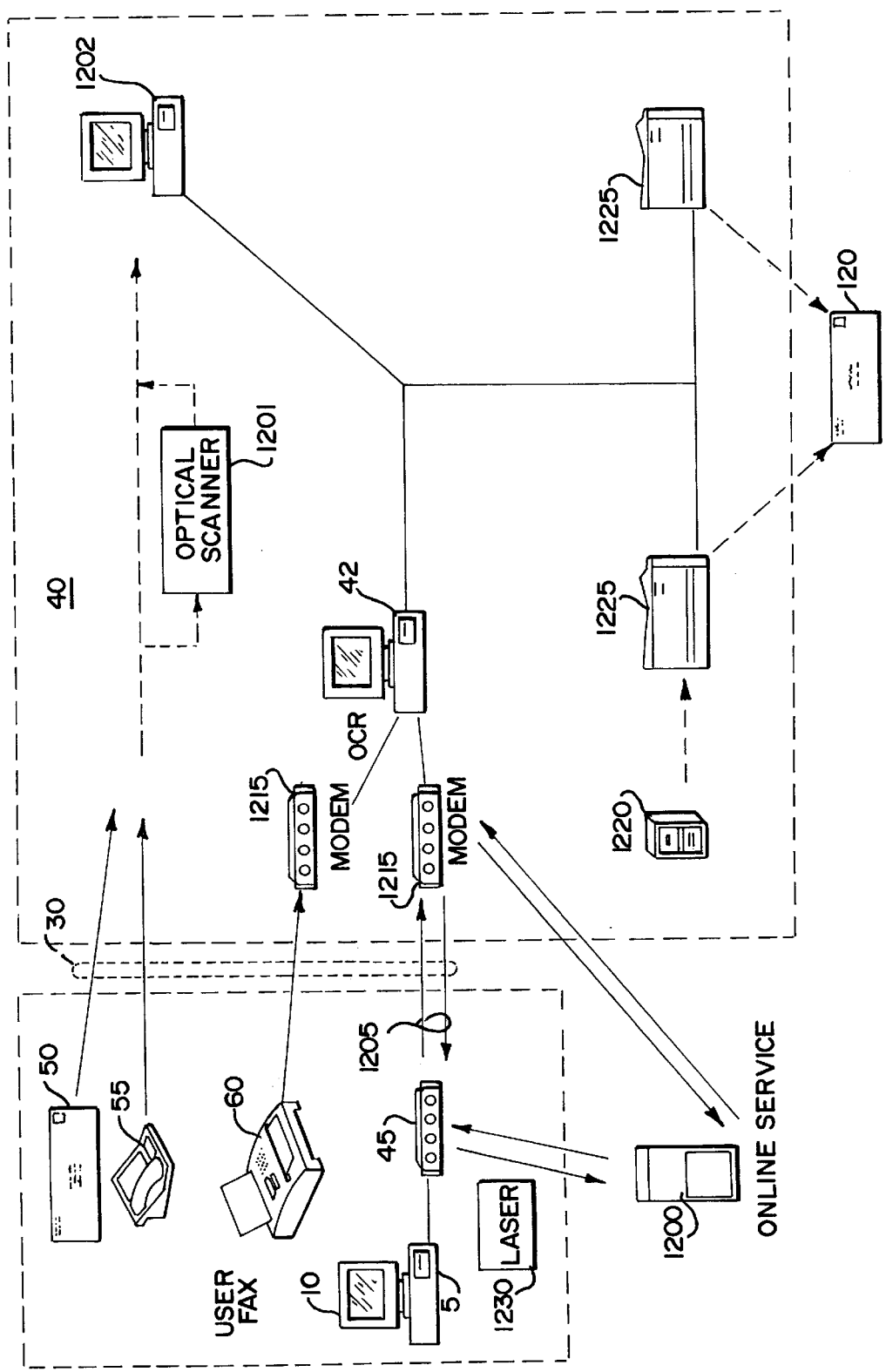
FIG. 11 is a generalized pictorial diagram depicting a specific embodiment of the hardware and the connections between the hardware and the card distribution center according to the present invention.

Referring now to FIGS. 1 and 11, FIG. 11 shows an expanded pictorial diagram of FIG. 1 without the software block. Like reference numbers are used to identify the same items shown in the figures. Several modes of transmission of the order 30 from the computer system 5 to the card distribution center 40 are available to the user depending upon the hardware present and the manner in which the system was originally configured. These modes include written mail 50, telephone orders 55, facsimile orders 60, on-line service orders 1200 and direct dial-up 1205 to the distribution center 40.

If the order 30 is sent via written mail 50 or facsimile 60, the computer system 5 prepares and prints the user's order on a form (not shown). This form is optimized for optical character recognition, and need only be optically scanned by an optical scanner 1201 at the card distribution center 40 and automatically processed. The optical scanner may be an HP Scanjet IIC marketed by Hewlett-Packard Corporation.

If the user transmits the order 30 by telephone 55, the computer system 5 displays all relevant information on the video display device 10 so that the user can read the order directly from the screen to personnel using a computer 1202 at the card distribution center 40 or the user can enter all relevant information using a touchtone keypad of the telephone 55. If the user sends the order 30 electronically, either by direct modem link 1205 or through the on-line service 1200, the computer system 5 generates a computer file containing the order and transmits this file to the computer 42 at the card distribution center 40. Transmission occurs between the computer system modem 45 and one or more modems 1215 at the card distribution center 40.

In an alternate embodiment, the computer system 5 is connected to the on-line service 1200 through the modem 45. This allows the user to communicate the order 30 to the card distribution center 40 without establishing a dedicated communication line between the user and the card distribution center 40.

Additionally, connection via the on-line service 1200 allows the user to select cards from an external card database. The on-line service 1200 has access to more cards than are available to the user of a fixed medium such as the cards residing on the hard disk 15.

In another alternate embodiment, the user may access a remote computing center via interactive television and may enter all information through a television control device. Once the information has been entered, the cards can be ordered from the card distribution center 40.

In another alternate embodiment, the user not only sends the order 30 electronically to the card distribution center 40, but also may send the card order to a co-user via electronic mail 35. The co-user may then add his own personalized message or signature to the card. Once the co-user has added the message or signature, he may send the order to the distribution center 40 or he may send the order back to the original user. In either event, the order is sent to the distribution center 40.

In operation, the method according to the present invention proceeds as follows: The user enters all necessary information into the computer system 5 described above and places the order 30 with the card distribution center 40. Once the card distribution center 40 receives the order 30, it retrieves the selected cards from a stock of inventory cards 1220. The personalized message or signature is then printed on the card by laser printer 1225 or other suitable printer. Alternatively, the laser printer 1225 may print the graphical card design on blank paper stock. In this way, the distribution center 40 need not stack each of the various cards but rather, can print each card from blank card stock on a high quality color printer. The cards 120 are then shipped to the recipients or to the customer via the user's carrier of choice at the appropriate time.

In another alternate embodiment, the user may print cards without use of the card distribution center 40. In this situation, the user enters all necessary information into the system 4 as described above, and directly prints the card on an attached printer 1230. Of course, the quality of the user printed cards depends upon the quality of the user's printer 1230 and the paper quality. The printer may be a color printer such as a Model BJC-600 marketed by Canon Corporation.

As best shown in Appendix A, a source code listing for the above-described software may be viewed which, for example, may be run on an IBM 486 compatible computer, running at 66 MHz under Microsoft Windows® Version 3.1. The software may be developed, for example, using Microsoft Visual Basic 3.0 Professional Edition using the custom control libraries, Q&E Multilink/VB Version 2.0 by Q&E Corporation, 3-D Gizmos 2.10, published by MicroHelp, Inc., ImageMan/VB 3.00, published by Data Techniques, Inc., VB Tools 3.1, published by MicroHelp, Inc., and VideoSoft Custom Control Library, published by VideoSoft.

Specific embodiments of the method and apparatus for selecting and ordering social expression cards according to the invention have been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. A method for on-going management, selection, and delivery of social expression cards and gifts to a recipient, the method comprising the steps of:
   storing data in at least one database, said data including recipient data and social expression card data;
   linking said recipient data with said social expression card data, thereby forming linked data to facilitate the on-going management, selection, and delivery of a social expression card to a selected recipient;
   providing a user interface to permit a user to access at least a portion of said data stored in said at least one database to permit the user to manage, select, and facilitate the delivery of a social expression card to said selected recipient; and
   providing said user with a send-by-date to facilitate the delivery of a gift to said recipient in coordination with said social expression card.

2. The method of claim 1 further comprising the step of:
   providing said user with data indicative of a plurality of methods by which delivery of said social expression card and gift to a recipient can be effected.

3. The method of claim 2 further comprising the steps of:
   receiving data from said user indicative of a one of said plurality of methods of delivery selected by said user; and
   providing said user with an indication when said selected method of delivery fails to correspond to said send-by date.

4. The method of claim 1 further comprising the step of:
   providing said user with data indicative of a plurality of gifts which may be included with said social expression card.

5. The method of claim 4 further comprising the step of:
   receiving data from said user indicative of a one of said plurality of gifts selected by said user; and
   scheduling delivery of said social expression card and said selected gift in coordination with said send-by date.

6. The method of claim 1 wherein said step of storing data comprises:
   storing a plurality of recipient data records for said user, each of said user's recipient data records containing data which defines a selected recipient; and
   storing a plurality of recipient occasion data records for said user, each of said user's recipient occasion data records containing data which defines a selected occasion for a selected recipient.

7. The method of claim 6 further comprising the steps of:
   storing a plurality of master occasion data records, each of said master occasion data records containing data which defines a selected occasion; and
   storing a plurality of social expression card data records, each of said social expression card data records containing data which defines a selected social expression card.

8. The method of claim 7 wherein the step of linking comprises:
   linking said recipient data records with said recipient occasion data records to define at least one recipient linked occasion for each of said plurality of recipients defined by said plurality of recipient data records;
   linking said at least one recipient linked occasion with said master occasion data records to define at least one recipient linked master occasion for each of said plurality of recipient linked occasions; and
   linking said at least one recipient linked master occasion with said social expression card data records to define at least one social expression card for each of said at least one recipient linked master occasion.

9. The method of claim 8 wherein said step of providing a user interface comprises:
   providing said user with data indicative of said defined at least one social expression card for at least one of: a user selected recipient, a user selected recipient occasion, a recipient occasion whose send-by date is a predetermined time from a date when said recipient occasion will occur.

10. The method of claim 1 further comprising the step of:
    providing said user with the ability to route said social expression card to a third party for personalization prior to delivery of said social expression card and gift to a recipient.

11. A computer program product for causing a computer to provide a user interface to permit a user to direct the management, selection, and delivery of social expression cards, the computer program product comprising a computer-usable medium having encoded thereon:

first computer-readable program code to cause said computer to store data, including recipient data and social expression card data, in at least one database;

second computer-readable program code to cause said computer to link at least said recipient data with said social expression card data thereby forming linked data to facilitate on-going management, selection, and delivery of a social expression card to said selected recipient;

third computer-readable program code to cause said computer to provide a user interface to permit a user to access at least a portion of said data stored in said at least one database, to permit the user to manage, select, and facilitate the delivery of a social expression card to said selected recipient; and fourth computer-readable program code to cause said computer to provide said user with a send-by-date to facilitate the delivery of a gift to said recipient in coordination with said social expression card.

12. The computer program product of claim 11 wherein said computer-usable medium has further encoded thereon:

fifth computer-readable program code to cause said computer to provide said user with providing said user with data indicative of a plurality of methods by which delivery of said social expression card and gift to a recipient can be effected.

13. The computer program product of claim 12 wherein said computer-usable medium has further encoded thereon:

sixth computer-readable program code to cause said computer to receive data from said user indicative of a one of said plurality of methods of delivery selected by said user; and seventh computer-readable program code to cause said computer to provide said user with an indication when said selected method of delivery fails to correspond to said send-by date.

14. The computer program product of claim 11 wherein said computer-usable medium has further encoded thereon:

fifth computer-readable program code to cause said computer to provide said user with data indicative of a plurality of gifts which may be included with said social expression card.

15. The computer program product of claim 14 wherein said computer-usable medium has further encoded thereon:

sixth computer-readable program code to cause said computer to receive data from said user indicative of a one of said plurality of gifts selected by said user; and seventh computer-readable program code to cause said computer to schedule delivery of said social expression card and said selected gift in coordination with said send-by date.

16. The computer program product of claim 11 wherein said first computer-readable program code comprises:

fifth computer-readable program code to cause said computer to store a plurality of recipient data records for said user, each of said user's recipient data records containing data which defines a selected recipient; and sixth computer-readable program code to cause said computer to store a plurality of recipient occasion data records for said user, each of said user's recipient occasion data records containing data which defines a selected occasion for a selected recipient.

17. The computer program product of claim 16 wherein said computer-usable medium has further encoded thereon:

seventh computer-readable program code to cause said computer to store a plurality of master occasion data records, each of said master occasion data records containing data which defines a selected occasion; and eighth computer-readable program code to cause said computer to store a plurality of social expression card data records, each of said social expression card data records containing data which defines a selected social expression card.

18. The computer program product of claim 17 wherein the second computer-readable program code comprises:

ninth computer-readable program code to cause said computer to link said recipient data records with said recipient occasion data records to define at least one recipient linked occasion for each of said plurality of recipients defined by said plurality of recipient data records;

tenth computer-readable program code to cause said computer to link said at least one recipient linked occasion with said master occasion data records to define at least one recipient linked master occasion for each of said plurality of recipient linked occasions; and eleventh computer-readable program code to cause said computer to link said at least one recipient linked master occasion with said social expression card data records to define at least one social expression card for each of said at least one recipient linked master occasion.

19. The computer program product of claim 18 wherein said third computer-readable program code comprises:

twelfth computer-readable program code to cause said computer to provide said user with data indicative of said defined at least one social expression card for at least one of: a user selected recipient, a user selected recipient occasion, a recipient occasion whose send-by date is a predetermined time from a date when said recipient occasion will occur.

20. The computer program product of claim 11 wherein said computer-usable medium has further encoded thereon:

fifth computer-readable program code to cause said computer to provide said user with the ability to route said social expression card to a third party for personalization prior to delivery of said social expression card and gift to a recipient.

21. A computer system for on-going management, selection, and delivery of social expression cards, the system comprising:

storage means for storing data, including at least card recipient data and social expression card data, in at least one database;

linking means coupled to the storage means, for linking said card recipient data with said social expression card data thereby forming linked data to facilitate on-going management, selection, and delivery of a social expression card to a selected recipient;

a user interface coupled to said storage means for permitting a user to access at least a portion of said data stored in said at least one database to permit the user to manage, select, and facilitate the delivery of a social expression card to said selected recipient; and means for providing said user with a send-by-date to facilitate the delivery of a gift to said recipient in coordination with said social expression card.

22. The computer system of claim 21 further comprising:
delivery selection means for providing said user with data indicative of a plurality of methods by which delivery of said social expression card and gift to a recipient can be effected.

23. The computer system of claim 22 further comprising:
user selection means for receiving data from said user indicative of a one of said plurality of methods of delivery selected by said user; and
date alerting means for providing said user with an indication when said selected method of delivery falls to correspond to said send-by date.

24. The computer system of claim 21 further comprising:
gift selection means for providing said user with data indicative of a plurality of gifts which may be included with said social expression card.

25. The computer system of claim 24 further comprising:
user selection means for receiving data from said user indicative of a one of said plurality of gifts selected by said user; and
gift scheduling means for scheduling delivery of said social expression card and said selected gift in coordination with said send-by date.

26. The computer system of claim 21 wherein said data storage means comprises:
recipient data means for storing a plurality of recipient data records for said user, each of said user's recipient data records containing data which defines a selected recipient; and
recipient occasion means for storing a plurality of recipient occasion data records for said user, each of said user's recipient occasion data records containing data which defines a selected occasion for a selected recipient.

27. The computer system of claim 26 further comprising:
master occasion means for storing a plurality of master occasion data records, each of said master occasion data records containing data which defines a selected occasion; and
social expression card means for storing a plurality of social expression card data records, each of said social expression card data records containing data which defines a selected social expression card.

28. The computer system of claim 27 wherein said linking means comprises:
recipient linking means for linking said recipient data records with said recipient occasion data records to define at least one recipient linked occasion for each of said plurality of recipients defined by said plurality of recipient data records;
recipient occasion linking means for linking said at least one recipient linked occasion with said master occasion data records to define at least one recipient linked master occasion for each of said plurality of recipient linked occasions; and
master occasion linking means for linking said at least one recipient linked master occasion with said social expression card data records to define at least one social expression card for each of said at least one recipient linked master occasion.

29. The computer system of claim 28 wherein said user interface comprises:
data display means for providing said user with data indicative of said defined at least one social expression card for at least one of: a user selected recipient, a user selected recipient occasion, a recipient occasion whose send-by date is a predetermined time from a date when said recipient occasion will occur.

30. The computer system of claim 21 further comprising:
card routing means for providing said user with the ability to route said social expression card to a third party for personalization prior to delivery of said social expression card and gift to a recipient.

31. A system for purchasing social, expression cards by a consumer using a personal computer to access a global communication network which connects said personal computer to an order processing facility, the system operational on said personal computer and comprising:
means for permitting a customer to input card recipient data, recipient occasion data, card design data, and card selection data,
means for storing said data input by said customer,
means for displaying said data input by said customer and social expression cards corresponding to said data input by said customer,
means for controlling display of said data input by said customer to facilitate card selection and ordering by said customer,
means for generating an order by said customer, including order history data and order status data, and storing said customers order history data and order status data,
means for linking said data input by said customer and said order history data and said order status data to facilitate management of card selection by said customer; and
means for transmitting said order received from said customer via said global communication network to an order processing facility, and
means for providing said user with a send-by-date to facilitate the delivery of a gift to said recipient in coordination with said social expression card.

32. The system for purchasing social expression cards of claim 31 further comprising:
means for providing said user with data indicative of a plurality of methods by which delivery of said social expression card and gift to a recipient can be effected.

33. The system for purchasing social expression cards of claim 32 further comprising:
means for receiving data from said user indicative of a one of said plurality of methods of delivery selected by said user; and
means for providing said user with an indication when said selected method of deliver fails to correspond to said send-by date.

34. The system for purchasing social expression cards of claim 31 further comprising:
means for providing said user with data indicative of a plurality of gifts which may be included with said social expression card.

35. The system for purchasing social expression cards of claim 34 further comprising:
means for receiving data from said user indicative of a one of said plurality of gifts selected by said user; and
means for scheduling delivery of said social expression card and said selected gift in coordination with said send-by date.

36. The system for purchasing social expression cards of claim 31 wherein said means for storing data comprises:
means for storing a plurality of recipient data records for said user, each of said user's recipient data records containing data which defines a selected recipient; and means for storing a plurality of recipient occasion data records for said user, each of said user's recipient occasion data records containing data which defines a selected occasion for a selected recipient.

37. The system for purchasing social expression cards of claim 36 further comprising:
  means for storing a plurality of master occasion data records, each of said master occasion data records containing data which defines a selected occasion; and
  means for storing a plurality of social expression card data records, each of said social expression card data records containing data which defines a selected social expression card.

38. The system for purchasing social expression cards of claim 37 wherein said means for linking comprises:
  means for linking said recipient data records with said recipient occasion data records to define at least one recipient linked occasion for each of said plurality of recipients defined by said plurality of recipient data records;
  means for linking said at least one recipient linked occasion with said master occasion data records to define at least one recipient linked master occasion for each of said plurality of recipient linked occasions; and
  means for linking said at least one recipient linked master occasion with said social expression card data records to define at least one social expression card for each of said at least one recipient linked master occasion.

39. The system for purchasing social expression cards of claim 38 wherein said means for generating an order comprises:
  means for providing said user with data indicative of said defined at least one social expression card for at least one of: a user selected recipient, a user selected recipient occasion, a recipient occasion whose send-by date is a predetermined time from a date when said recipient occasion will occur.

40. The system for purchasing social expression cards of claim 31 further comprising:
  means for providing said user with the ability to route said social expression card to a third party for personalization prior to delivery of said social expression card and gift to a recipient.

41. A method for on-going management, selection, and delivery of social expression cards, the method comprising the steps of:
  storing a plurality of recipient data records for said user, each of said user's recipient data records containing data which defines a selected recipient;
  storing a plurality of recipient occasion data records for said user, each of said user's recipient occasion data records containing data which defines a selected occasion for a selected recipient;
  storing a plurality of social expression card data records, each of said social expression card data records containing data which defines a selected social expression card;
  linking said recipient data, said recipient occasion data, and said social expression card data, thereby forming linked data to facilitate the on-going management, selection, and delivery of a social expression card to a selected recipient; and
  providing a user interface to permit a user to access at least a portion of said data stored in said at least one database to permit the user to manage, select, and facilitate the delivery of a social expression card to said selected recipient.

42. The method of claim 41 wherein the step of linking comprises:
  linking said recipient data records with said recipient occasion data records to define at least one recipient linked occasion for each of said plurality of recipients defined by said plurality of recipient data records;
  linking said at least one recipient linked occasion with said social expression card data records to define at least one social expression card for each of said at least one recipient linked occasion.

43. The method of claim 41 wherein said step of providing a user interface comprises:
  providing said user with data indicative of said defined at least one social expression card for at least one of: a user selected recipient, a user selected recipient occasion, a recipient occasion whose send-by date is a predetermined time from a date when said recipient occasion will occur.

44. The method of claim 41 further comprising the step of:
  providing said user with the ability to route said social expression card to a third party for personalization prior to delivery of said social expression card to a recipient.

45. A system for on-going management, selection, and delivery of social expression cards, the method comprising:
  means for storing a plurality of recipient data records for said user, each of said user's recipient data records containing data which defines a selected recipient;
  means for storing a plurality of recipient occasion data records for said user, each of said user's recipient occasion data records containing data which defines a selected occasion for a selected recipient;
  means for storing a plurality of social expression card data records, each of said social expression card data records containing data which defines a selected social expression card;
  means for linking said recipient data, said recipient occasion data, and said social expression card data, thereby forming linked data to facilitate the on-going management, selection, and delivery of a social expression card to a selected recipient; and
  means for providing a user interface to permit a user to access at least a portion of said data stored in said at least one database to permit the user to manage, select, and facilitate the delivery of a social expression card to said selected recipient.

46. The system of claim 45 wherein the means for linking comprises:
  means for linking said recipient data records with said recipient occasion data records to define at least one recipient linked occasion for each of said plurality of recipients defined by said plurality of recipient data records;
  means for linking said at least one recipient linked occasion with said social expression card data records to define at least one social expression card for each of said at least one recipient linked occasion.

47. The system of claim 45 wherein said means for providing a user interface comprises:
  means for providing said user with data indicative of said defined at least one social expression card for at least one of: a user selected recipient, a user selected recipient occasion, a recipient occasion whose send-by date is a predetermined time from a date when said recipient occasion will occur.

48. The system of claim 45 further comprising:

means for providing said user with the ability to route said social expression card to a third party for personalization prior to delivery of said social expression card to a recipient.

49. A system for purchasing social expression cards by a consumer using a communication device to access a global communication network which connects said communication device to an order processing facility, for on-going management, selection, and delivery of social expression cards, the order processing facility comprising:

recipient data storage means for storing a plurality of recipient data records for said user, each of said user's recipient data records containing data which defines a selected recipient;

occasion data storage means for storing a plurality of recipient occasion data records for said user, each of said user's recipient occasion data records containing data which defines a selected occasion for a selected recipient;

social expression card data storage means for storing a plurality of social expression card data records, each of said social expression card data records containing data which defines a selected social expression card;

data linking means for linking said recipient data, said recipient occasion data, and said social expression card data, thereby forming linked data to facilitate the on-going management, selection, and delivery of a social expression card to a selected recipient; and user access means for providing a user interface to permit a user to access at least a portion of said data stored in said at least one database to permit the user to manage, select, and facilitate the delivery of a social expression card to said selected recipient.

50. The order processing facility of claim 49 wherein said data linking means comprises:

recipient occasion linking means for linking said recipient data records with said recipient occasion data records to define at least one recipient linked occasion for each of said plurality of recipients defined by said plurality of recipient data records;

social expression card linking means for linking said at least one recipient linked occasion with said social expression card data records to define at least one social expression card for each of said at least one recipient linked occasion.

51. The order processing facility of claim 49 wherein said user access means comprises:

user data display means for providing said user with data indicative of said defined at least one social expression card for at least one of: a user selected recipient, a user selected recipient occasion, a recipient occasion whose send-by date is a predetermined time from a date when said recipient occasion will occur.

52. The order processing facility of claim 49 further comprising:

social expression card routing means for providing said user with the ability to route said social expression card to a third party for personalization prior to delivery of said social expression card to a recipient.

* * * * *

UNITED STATES PATENT AND TRADEMARK OFFICE
CERTIFICATE OF CORRECTION

PATENT NO : 6,092,054
DATED : July 18, 2000
INVENTOR(S) : Mary T. Tackbary, et al.

It is certified that error appears in the above-identified patent and that said Letters Patent is hereby corrected as shown below:

Col. 8, line 14
  replace "60"
  with --600--.

Col. 19, line 47
  replace "said"
  with --a--.

Col. 19, line 66
  delete "said".

Col. 20, line 15
  delete "at least one".

Col. 20, line 28
  replace the first occurance of "said"
  with --a--.

Col. 20, line 44
  delete "said".

Col. 20, line 62
  delete "at least one".

Col. 21, line 13
  replace "said"
  with --a--.

UNITED STATES PATENT AND TRADEMARK OFFICE
CERTIFICATE OF CORRECTION

PATENT NO : 6,092,054
DATED : July 18, 2000
INVENTOR(S) : Mary T. Tackbary, et al.

It is certified that error appears in the above-identified patent and that said Letters Patent is hereby corrected as shown below:

Col. 22, line 1
  delete "said".

Signed and Sealed this

Second Day of January, 2001

Attest:

Q. TODD DICKINSON

Attesting Officer     Commissioner of Patents and Trademarks